March 28, 1950     C. L. FOREIT     2,502,138
LAWN MOWER LOAD CARRIER ATTACHMENT
Filed Nov. 21, 1946
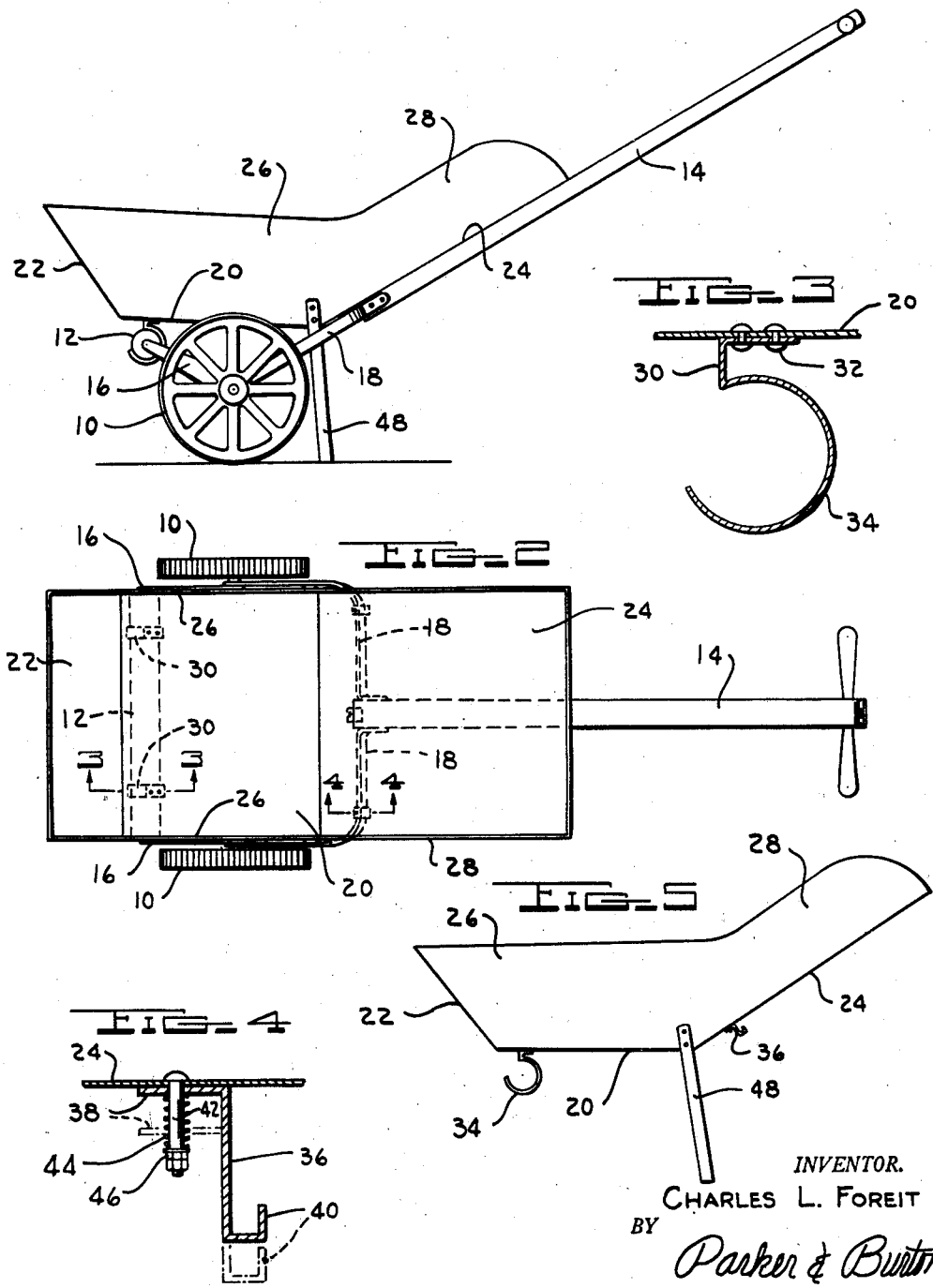
INVENTOR.
CHARLES L. FOREIT
BY
*Parker & Burton*
ATTORNEYS Patented Mar. 28, 1950

2,502,138

UNITED STATES PATENT OFFICE 2,502,138

LAWN MOWER LOAD CARRIER ATTACHMENT

Charles L. Foreit, Detroit, Mich.

Application November 21, 1946, Serial No. 711,379

2 Claims. (Cl. 56—249)

This invention relates to an attachment for lawn mowers and particularly to an attachment therefor in the form of a load carrying body.

An important object of this invention is to provide a novel attachment for lawn mowers which is adapted to be readily attachable thereto for converting the lawn mower into an implement for shifting relatively heavy loads from one place to another. Another important object of the invention is to provide an improved load carrier which is adaptable for quick attachment to and detachment from conventional lawn mowers and which is adjustable to fit different types of lawnmowers. A further object of this invention is to provide such a load carrier which is of relatively large size for carrying large and heavy loads and which is shaped for convenient carrying of the loads. A novel feature of the invention is the provision of means on the load carrying attachment which when mounted on the lawn mower is capable when the lawn mower is unattended of serving as a prop to support the lawn mower with the handle in raised position.

Various other objects, advantages and meritorious features will become more fully apparent from the following specification, appended claims and accompanying drawings wherein:

Fig. 1 is a side elevation of a lawn mower in inverted position showing the manner of mounting attachment of this invention thereon, Fig. 2 is a top plane view of the load carrying attachment mounted in place on a lawn mower, Fig. 3 is an enlarged detail sectional view of the roller engaging detachable connecting means, Fig. 4 is an enlarged detail sectional view of the handle engaging detachable connecting means, and Fig. 5 is a side elevation of the attachment separate and apart from the lawn mower.

Referring particularly to the drawings, a conventional type of lawn mower is illustrated in Figs. 1 and 2 comprising a pair of side wheels 10—10 journaled upon an axle about which the grass cutting elements revolve. In the two views in the drawings the lawn mower is inverted or upside down so that the normal trailing roller 12 is raised above the ground and forms the front of the lawn mower. This is usually accomplished by swinging the handle 14 from its normal cutting position forwardly over the wheels to an angle such as that shown in Fig. 1. As this occurs the trailing roller is raised to the elevated position shown in Fig. 1. When the handle is in the position in Fig. 1 and is pushed, the cutting elements are inoperable and the lawn mower moves with considerable less resistance. The roller 12 is secured by side plates or arms 16 to the axle structure of the lawn mower in the conventional manner. The handle 14 has a bifurcated connection to the axle structure in the form of two outwardly extending metal bars or arms 18—18 which are bent forwardly parallel to one another to pass close to the inside of the wheels 10—10 as shown in Fig. 2. This is the usual construction although the bifurcated connection may be of various arrangements in the different makes of lawn mowers.

The load carrying body attachment of this invention is shaped in a novel manner to occupy a considerable area of the lawn mower in inverted position. As shown in the various figures, the body has an opened top. It comprises a base or bottom plate 20, an upwardly and outwardly inclined front wall 22, an upwardly and outwardly inclined rear wall 24, and spaced parallel side walls 26—26. In order to increase the load carrying capacity of the body, the rear wall 24 and the rear end sections 28—28 of the side walls 26—26 are shaped so as to extend a considerable distance along the handle 14 of the lawn mower. Preferably, the rear wall 24 has a length approximating twice that of the front wall 22. The rear end sections 28—28 follow the upward inclination of the rear wall with the upper edges thereof in substantially parallel relationship to the plane of the rear wall. The rear wall 24, as indicated in the drawings, extends substantially coextensive with the upper face of the handle and normally rests thereon for support.

Depending from the front end of the load carrying body, preferably from the bottom 20 thereof adjacent to the front wall 22, are one or more detachable connecting devices or clips for mounting the front end of the body on the elevated trailing roller 12. Referring to Fig. 2, each device comprises a downwardly extending member 30 secured by rivets 32 or the like to the underside of the bottom plate 20. The lower end section 34 of each member is shaped into an arc which extends approximately 270°. The radius of curvature of the lower end section is substantially equal to the radius of curvature of the conventional trailing roller used on lawn mowers. Each member is preferably formed of springy metal stock so that it may be sprung slightly apart as it is fitted on the roller and then allowed to assume its normal curvature in clamped position on the roller. Preferably the curved section 34 of these connecting devices opens forwardly as shown. Two such connecting devices are shown in the illustrated embodiment of the invention, and it is understood that fewer or more such devices may be employed on the load carrier for this purpose if desired.

Depending from the rear end of the load carrying body, preferably from the rear wall 24 thereof adjacent to its connection to the bottom plate 20, are one or more detachable connecting devices or clips for mounting the rear end of the body on the handle 14. Referring to Fig. 4, each such device comprises a depending member 36 having at the upper end a right angular extending portion 38 and at the lower end an upturned hook-shaped portion 40. The upper end portion 38 is apertured to receive a bolt member 42 mounted in and projecting downwardly from the rear wall 24. The member 36 including the two end portions is movable up and down the bolt as indicated by a comparison of the full and dotted positions of this member in Fig. 4. Encircling the bolt of each connecting device is a coiled spring 44 which is seated at its lower end on a lock nut assembly 46 of the bolt and at its upper end on the underside of the end portion 38. As evident, the spring constrains the member 36 to its uppermost position shown in full lines in Fig. 4. The member 36 is free to swing or rotate about the bolt 40 as an axis for the purpose of adjusting the connecting device for different types of lawn mowers and to facilitate attachment.

When the load carrying body is mounted on the lawn mower, the clips 36 are pulled down against the resistance of their respective springs 42 to carry the hooked end 40 under the bars 18—18 of the bifurcated connection between the handle and the cutting mechanism of the lawn mower. Upon release, the spring of each device will lift the member 36 carrying the hooked end into engagement with the bottom edges of the bars 38—38 interlocking the body to the lawn mower. Three such connecting devices 36—40 are employed in the illustrated embodiment of the invention. More or less may be used if desired. The middle clip of the three clips 36 employed in the illustrated embodiment of the invention may omit the upturned end on the hook 40 in order to flatly engage the underside of the forward end of the handle 14. When the body is mounted on the lawn mower by the forward clips 30 and the rear clips 36 it is held against fore and aft movement thereon.

In order to hold the body against lateral shiftable movement, novel means is employed on the body which engages a part of the lawn mower for this purpose. This means preferably comprises a depending bar 48 on each side of the body which when the body is mounted on the lawn mower extends closely past the inside face of the adjacent arm 18 of the bifurcated connection. The bars 48 are adapted to immediately engage the arms 18—18 when any lateral shifting of the body takes place thus serving to hold the body centered on the lawn mower out of contact with the wheels 10—10.

Each depending bar 48 serves another purpose. It is made relatively long as shown in Figs. 1 and 5 so as to contact the ground when the lawn mower is rocked in a clockwise direction in Fig. 1. When contacting the ground in this manner, the bars 48—48 function as props to hold the handle in raised position and the bottom of the body in relatively horizontal position. Thus the lawn mower with its attachment may be left unattended in upright load carrying position.

The outward inclination of the front wall 22 enables the load carried by the body to be dumped or spilled by tipping the lawn mower forwardly. When it is desired to remove the body from the lawnmower it may be easily detached by first retracting the clips 36 against the springs 44 and turning them so that they will not re-engage the arms 18—18 and the handle. Upon lifting the back end of the body and exerting a rearward pulling force at the same time it is possible to snap the forward clips 32—34 off from the roller 12, following which the body is lifted entirely from the lawn mower.

The body may be made of relatively light metal such as cold rolled steel, aluminum or galvanized tin. Although lightweight in construction, the body has a large load carrying capacity. The rear wall 24 and the side wall sections 28—28 extend for a considerable length of the handle 14 for this purpose and as shown in the drawings may overlie approximately one-half the length of the handle.

What I claim is:

1. A load carrying attachment for lawn mowers comprising, in combination, a body formed of a flat normally horizontal bottom section, upwardly and outwardly inclined front and rear end sections, and a pair of spaced parallel substantially vertical side wall sections, said sections being joined together and forming an enclosure closed on all sides except the top side thereof, said bottom section having a lateral dimension slightly less than the distance between the ground engaging side wheels of a lawn mower in order to be received therebetween and a longitudinal dimension such that when the body is mounted on an inverted lawn mower the front edge of the bottom section is disposed forwardly of the elevated normally trailing roller of the lawn mower and the rear edge thereof is located immediately adjacent to the handle of the lawn mower, said inclined rear end section of the body in such mounted position extending parallel to the upwardly and rearwardly inclined handle of the lawn mower and having its upper edge terminated approximately midway of the length of the handle, one or more arcuate clips depending from the bottom section adjacent to the front edge thereof for detachable connection to the elevated roller of the lawn mower and acting to prevent forward shiftable movement of the body relative to the lawn mower, a pair of upwardly opening U-shaped clips for detachable engagement with the bifurcated connection of the handle to the side wheels of the lawn mower, means swivelingly connecting each of said U-shaped clips about a vertical axis to the underside of the body in depending relation thereto and yieldingly urging the clip in an upward direction to draw the rear inclined section into supporting engagement with the handle, and a pair of legs carried by the body and depending below the bottom section thereof and having such a length as to engage the ground to assist in supporting the body and the lawn mower to which it is attached so that the bottom section extends substantially horizontally, said legs located on the opposite sides of the body and inside of and immediately adjacent to the bifurcated handle connection of the lawn mower such that the legs are abuttingly engageable therewith to prevent lateral shiftable movement of the body on the lawn mower.

2. A load carrying attachment for lawn mowers comprising, in combination, a body formed of a flat normally horizontal bottom section, upwardly and outwardly inclined front and rear end sections, and a pair of spaced parallel substantially vertical side wall sections, said sections being jointed together to form an enclosure closed on all sides except the top side thereof, said bottom section having a lateral dimension slightly less than the distance between the ground engaging side wheels of a lawn mower in order to be received therebetween and a longitudinal dimension such that when the body is mounted on an inverted lawn mower the front edge of the bottom section is disposed forwardly of the elevated normally trailing roller of the lawn mower and the rear edge thereof is located immediately adjacent to the handle of the lawn mower, means depending from the bottom section of the body adjacent to the front edge thereof for detachably engaging the elevated roller of the lawn mower and acting to prevent the body from shifting forwardly relative to the lawn mower, said inclined rear end section of the body having a length such that the upper edge thereof is disposed approximately midway of the length of the handle of the lawn mower, disconnectible means depending from the underside of the inclined rear end section of the body and formed so as to extend around a portion of the handle of the lawn mower, said last means including a spring for drawing the rear end section of the body against the handle into bearing contact therewith for support therefrom and for holding the body from rearward shiftable movement relative to the lawn mower, and a pair of legs carried by the body and depending below the bottom section thereof having such a length as to engage the ground to assist in supporting the body and the lawn mower to which it is attached in upright position, said legs located on opposite sides of the body and inside of and immediately adjacent to the bifurcated portion of the lawn mower handle and so disposed with respect to the bifurcated portion of the handle as to engage the same and prevent lateral shiftable movement of the body relative to the lawn mower.

CHARLES L. FOREIT.

REFERENCES CITED

The following references are of record in the file of this patent:

UNITED STATES PATENTS

| Number | Name | Date |
|---|---|---|
| 1,338,144 | McNeill | Apr. 27, 1920 |
| 2,242,710 | Loomis | May 20, 1941 |
| 2,308,218 | Underwood | Jan. 12, 1943 |
| 2,326,739 | Andrews | Aug. 17, 1943 |